United States Patent [19]

Olaiz

[11] Patent Number: 5,702,039
[45] Date of Patent: Dec. 30, 1997

[54] STROLLER SUSPENDED UTILITY BELT

[75] Inventor: James Olaiz, Fountain Valley, Calif.

[73] Assignee: Junior Products Inc., Santa Ana, Calif.

[21] Appl. No.: 773,916

[22] Filed: Dec. 27, 1996

[51] Int. Cl.⁶ .................................................. B60R 11/00
[52] U.S. Cl. .................... 224/409; 224/572; 224/250;
224/251; 446/227; 248/102; 24/3.13; 280/33.992;
D21/63
[58] Field of Search .................................. 224/409, 411,
224/148.1, 148.5, 148.7, 250, 251, 255,
463, 572; 248/102, 103, 104, 106, 205.2;
24/306, 442, 3.13; 211/113, 118; 446/227;
280/647, 650, 304.5, 288.4, 33.992; D21/62,
63

[56] References Cited

U.S. PATENT DOCUMENTS

| | | | |
|---|---|---|---|
| D. 356,531 | 3/1995 | Valenti | D21/63 |
| 452,830 | 5/1891 | Bowie et al. | |
| 2,303,728 | 12/1942 | Drayton et al. | 248/102 |
| 2,327,253 | 8/1943 | Eisel | 446/227 |
| 2,539,698 | 11/1951 | Pearson | |
| 2,781,959 | 2/1957 | Loveland | 224/572 |
| 3,085,610 | 4/1963 | Vardan | 446/227 |
| 3,638,284 | 2/1972 | Baker | |
| 3,978,610 | 9/1976 | Stubbman | |
| 4,220,302 | 9/1980 | Hampton et al. | |
| 4,449,654 | 5/1984 | Cappis | 224/250 |
| 4,498,613 | 2/1985 | Donahue | |
| 4,537,341 | 8/1985 | Kelly | |
| 4,540,219 | 9/1985 | Klinger | 446/227 |
| 4,722,713 | 2/1988 | Williams et al. | |
| 4,805,937 | 2/1989 | Boucher et al. | |
| 4,830,238 | 5/1989 | Widinski et al. | |
| 4,881,746 | 11/1989 | Andreesen | 280/33.992 |
| 4,934,646 | 6/1990 | Doyle | |
| 4,946,119 | 8/1990 | Hellhake | |
| 4,989,811 | 2/1991 | Millis et al. | |
| 5,012,963 | 5/1991 | Rosenbaum | 224/572 |
| 5,031,282 | 7/1991 | Denaro | |
| 5,076,520 | 12/1991 | Bro | 446/227 |
| 5,082,220 | 1/1992 | Pollock et al. | 248/104 |
| 5,104,076 | 4/1992 | Goodall, Jr. | |
| 5,464,183 | 11/1995 | McConnel et al. | |
| 5,465,888 | 11/1995 | Owens | 224/148.5 |
| 5,613,657 | 3/1997 | Olaiz | 248/102 |

FOREIGN PATENT DOCUMENTS 2280096  1/1995  United Kingdom .................. 224/250

*Primary Examiner*—Henry J. Recla
*Assistant Examiner*—Gregory M. Vidovich
*Attorney, Agent, or Firm*—Price, Gess & Ubell

[57] ABSTRACT

A utility belt attachable to the two sides of a stroller in front of the occupant includes a plurality of tethers adapted to retain various objects relating to entertaining infants and small children. A traverse strap is suspended from two circular stroller frame members using Velcro hook-and-loop attachment to permit adjustment to various sized strollers. A plurality of object-holding tethers are fastened at a first end to the traverse strap. Each tether has a free end which is adapted to secure an item thereto such that toys, pacifiers, bottles, and the like. These items are thus secured to the stroller. A tether permanently attached to the traverse strap is provided with a ring which is sized to fit onto the neck of a feeding bottle and secure to the bottle when the lid is tightened onto the neck.

13 Claims, 2 Drawing Sheets

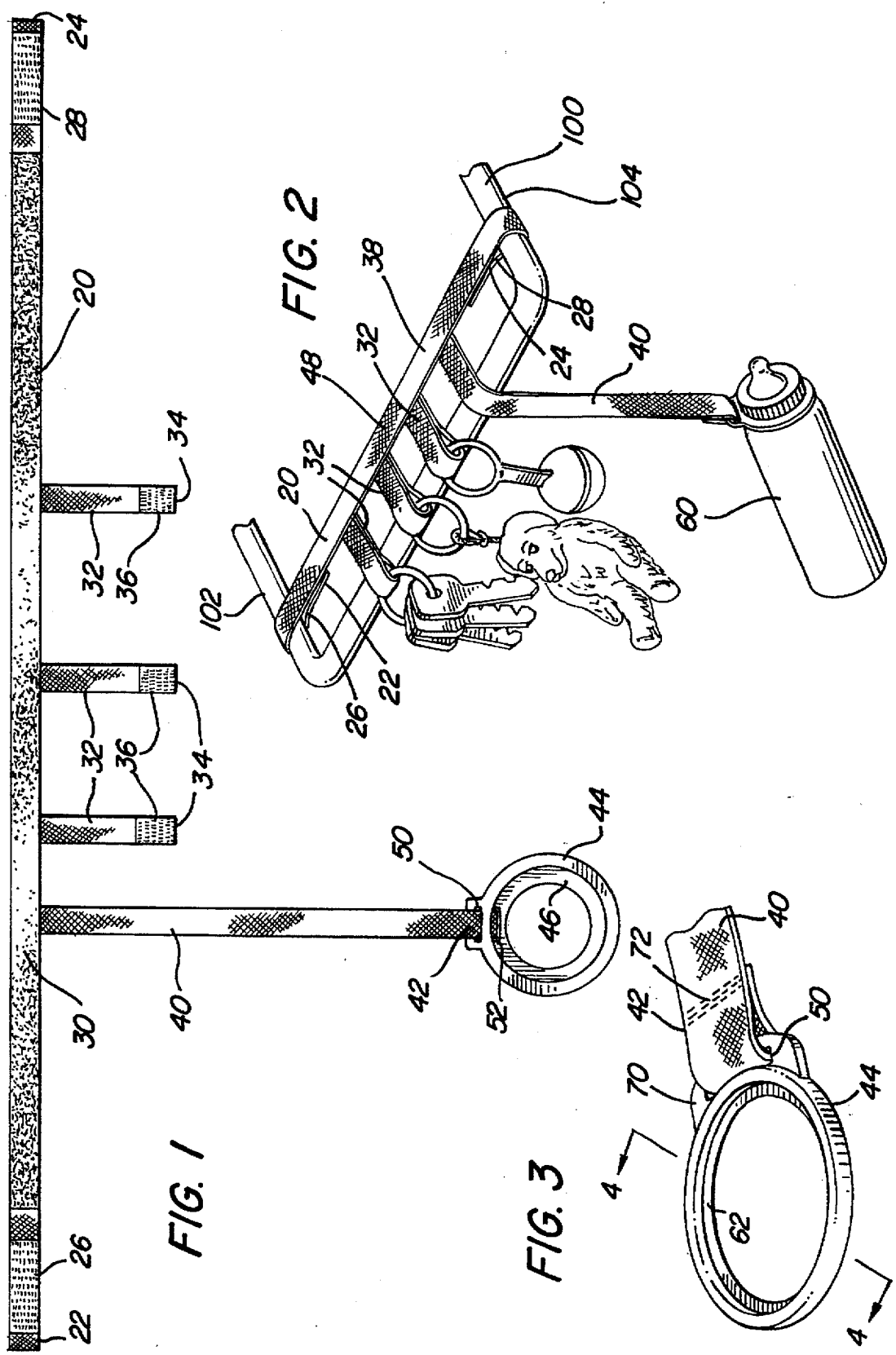

STROLLER SUSPENDED UTILITY BELT

BACKGROUND OF THE INVENTION

1. Field of the Invention

The present invention relates to attachments to baby strollers and the like and, specifically, to straps securable to the front of a stroller or the like for retaining various toys, baby supplies, or items of amusement.

2. Description of Related Art

It is well known that infants and babies lack the muscle development and coordination of older children and do not appreciate the consequences of certain actions taken by them. As a result, infants oftentimes throw objects or drop objects which are of value or which for sanitary reasons should remain clean. For example, small children will drop a toy or a bottle on the floor when it no longer interests them, or such an item may be dropped without the child even knowing that the item has been discarded. Once dropped, an item must be cleaned and sanitized because infants also place items in their mouths, which can lead to diseases and infections. Furthermore, lost items such as toys, pacifiers, and bottles are expensive to replace, and for this reason some manufactures of these products have recently begun including a connecting leash or tether to facilitate attachment to an anchor, thereby keeping the item from becoming lost. The tether may be connected to the infant's clothing. The parent or caretaker must fasten one tether for each item which needs to be accounted for. This system is unsatisfactory because it is unwieldy and potentially dangerous to the child, who may get wrapped in the tethers, or the tether may get caught on a stationary object, causing the child to be jerked suddenly.

Infants in strollers are often given toys or other objects to hold in order to amuse or pacify the child. When a child discards or drops these items, as a child is prone to do, they may become dirty, infected, or lost. An adult pushing the stroller may not see the object being discarded and may continue to push the stroller oblivious to the lost item. The problem can lead to replacement of a wide assortment of expensive baby supplies, at significant cost to the parent. Even if located, it may be difficult or impossible to properly sanitize a bottle, nipple, or pacifier. While the prior art contains a variety of mounting systems for strollers, a system for retaining items of amusement for the child within the stroller, while permitting the child to hold and use them in a normal manner, is lacking.

McConnell et al., U.S. Pat. No. 5,464,183, discloses a stroller accessory bar and drink holder which is mountable to the handle portion of the stroller and is designed to mount a drink holder as well as hold "shopping bags, a diaper bag, etc." McConnell et al. does not address the problem and is not directed to the child, but rather to the operator of the stroller. Items of concern to the operator are conveniently mounted near the push bar to facilitate operation of the stroller.

Hellhake, U.S. Pat. No. 4,946,119, discloses a security support for a feeding bottle comprising a strap which is adapted to secure a bottle in the event that a baby discards the bottle. The strap is shown connected to a baby stroller. However, Hellhake teaches only a strap having one end designed to hold a bottle and the opposite end designed to mount on a tubular element. Other items cannot be connected to the strap. The strap suffers the limitation of either still permitting the bottle to be cast away in the direction of the mounting, or being too short to provide any freedom of movement for the child.

Widinski et al., U.S. Pat. No. 4,830,238, discloses a carrying device which mounts to the handle portion of a stroller and is directed to the operator of the stroller. The device comprises a bag with pockets which can be used to carry various supplies. As with McConnell, Widinski et al. does not address the problems concerning the propensity of the child to discard or drop items along a journey.

Boucher et al., U.S. Pat. No. 4,805,937, discloses a handle cover and seat cover for a shopping cart formed from a padded fabric. The cover is alleged to provide protection from dirt and germs, and further includes a seat cover for added protection and comfort. Boucher et al. shows that small toys may be secured to the fabric via snaps. The reference does not show means for holding a feeding bottle, and only toys which have specifically adapted cooperating snaps can be secured to the handle cover.

The prior art lacks a stroller mounting apparatus that is easily attachable to and removable from a variety of different type strollers and which is designed to allow infants and small children to view or grasp a variety of objects connected to the stroller, including a feeding bottle, while maintaining a leash on each of the objects to prevent the items from being discarded and lost by the child while in the stroller.

OBJECTS AND SUMMARY OF THE INVENTION

The present invention is directed to a utility belt for a stroller which adjusts to a variety of stroller sizes and includes tethers which secure toys and a bottle in front of the stroller's occupant. The utility belt comprises a traverse strap which extends across the front of the stroller and is mountable to each side using variable length fastening means such as Velcro (hook and loop fasteners) or snaps. Connected to the traverse strap are a plurality of colorful tethers which are removably connectable at a free end to toys or playthings and which maintain the toys or playthings in view of the stroller's occupant while securing the objects to the stroller. In a preferred embodiment, the traverse strap has a first side which includes a strip of Velcro loop material substantially along the surface except for a region at each end, and the attachment means and tethers are each mountable to the Velcro strip via Velcro hook engagement material attached thereto. The traverse strap has permanently attached thereto a tether which is specifically designed to secure a feeding bottle.

BRIEF DESCRIPTION OF THE DRAWINGS

The exact nature of this invention, as well as all its objects and advantages, will become readily apparent upon reference to the following detailed description when considered in conjunction with the accompanying drawings, in which like reference numerals designate like parts throughout the figures thereof, and wherein:

FIG. 1 is a plan form view of a preferred embodiment of the present invention;

FIG. 2 is a perspective view of the preferred embodiment of the present invention;

FIG. 3 is a perspective view of the long tether and bottle retaining rings;

DESCRIPTION OF THE PREFERRED EMBODIMENTS

Figure 4:
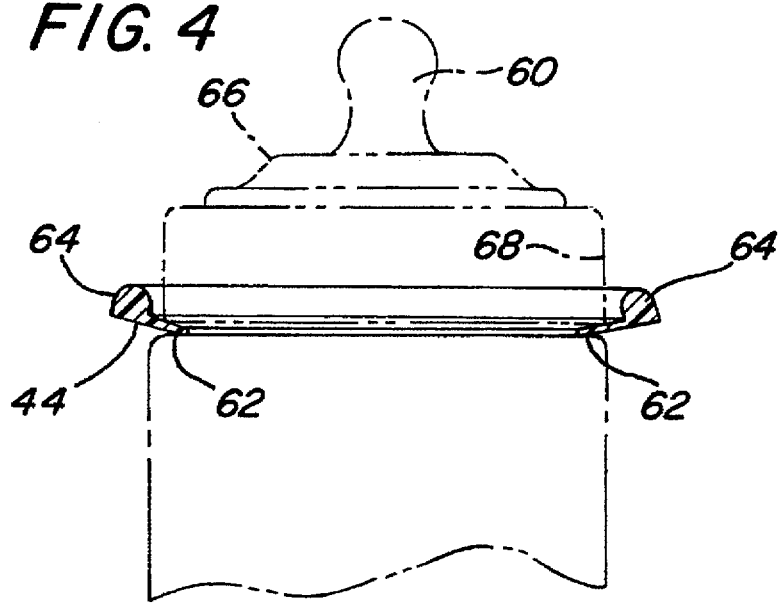
FIG. 4 is a cross-sectional view of the retainer ring.

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide a utility belt for a stroller which secures toys and feeding bottles to the stroller while permitting the occupant of the stroller to use and hold the items.

FIG. 1 is a planform view of the present invention which shows a traverse strap 20 which has first and second ends 22, 24. In a preferred embodiment described herein, a first surface of the traverse strap 20 comprises a region of Velcro loops 26 at the end 22 and another region of Velcro loops 28 at the end 24, and a region of Velcro hooks 30 generally spanning the area between the two loops regions 26, 28. It is to be understood that the system of Velcro hooks and loops are interchangeable, and that the two elements can be switched without loss of performance or utility. A plurality of tethers 32 are connected to the traverse strap 20 such as by sewing the tethers 32 thereto, and each tether 32 includes at its flee end 34 a region of Velcro loops 36. The tethers can be of various colors or, for that matter, may each be of different colors to add to the aesthetic appearance of the utility belt, and the surface 38 of the traverse strap 20 opposite the Velcro hooks and loops regions, which faces forward as shown in FIG. 2 when mounted on a stroller 100, may include a portion 48 which may include a design or text to add to the appearance of the utility belt. Also connected to the traverse strap 20 is a long tether 40 having a free end 42 which is adapted to secure to a feeding bottle 60. Two tings 44, 46 are connected at the free end 42 of the long tether 40 by passing the tether 40 through slots 50, 52 in the rings. The rings 44, 46 are used to secure a standard feeding bottle 60 as described below.

FIG. 2 illustrates the present invention mounted to the from of a stroller 100. As shown, first end 22 is secured to a side of the stroller by wrapping around the side 102 and fastening the Velcro loops region 26 to the Velcro hooks region 30, and at the opposite end the Velcro loops region 28 wraps around side 104 and is fastened to the Velcro hooks region 30. The use of Velcro hooks and loops permit the utility belt to adjust easily to different widths of strollers such that one size fits all standard size strollers. The tethers 32 are each shown depending from the traverse strap 20 and secured to a different item by inserting the free end 34 into a ring or hole and then securing the region of Velcro loops 36 on the tether's free end 34 to the region of Velcro hooks 30 on the traverse strap 20. In this manner, items such as toys and pacifiers remain in view of the child occupant and can be grasped and played with, but the objects remain secured to the stroller 100.

In FIG. 3 a more detailed view of the free end 42 of the longer tether 40 and ring 44 is shown. Ring 44 has a flat annular element 62 and a circular berm 64 around the outer perimeter of the ring 44. The annular element 62 is slightly beveled and is sized to fit over the neck of a feeding bottle 60, shown in phantom in FIG. 4, such that when the lid 66 of the feeding bottle 60 is tightened onto the neck 68, ring 44 is secured therebetween. A tab 70 on the ring 44 includes a slot 50 that receives the long tether 40, which is fastened back onto itself by means of stitching 72 to maintain the ring 44 thereon.

Figure 5:
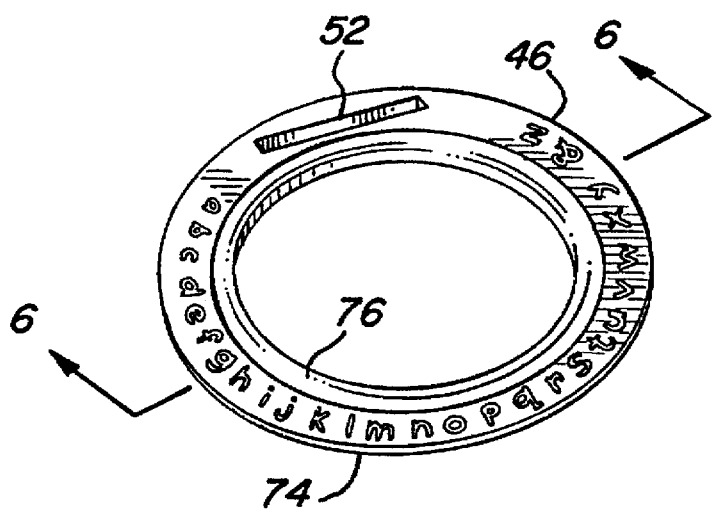
FIG. 5 is a perspective view of the second bottle retention ring.
Figure 6:
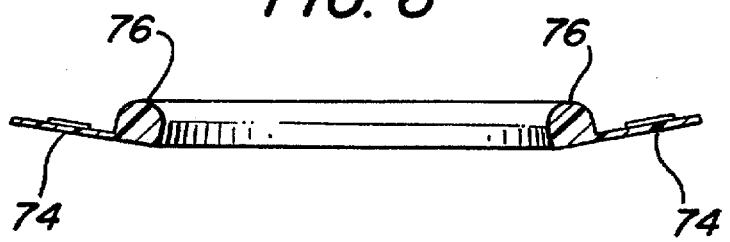
FIG. 6 is a cross-sectional view of the second bottle retention ring.

FIGS. 5 and 6 illustrate a second ring 46 which can be mounted in addition to ring 44 or may be substituted for ring 44. Ring 46 includes a generally flat outer annular element 74 and a berm 76 in the inner edge thereof. A slot 52 is provided for passing the long tether 40 through for connecting the ring 46 as described above. On the upper surface of the annular element may be provided figures, characters, or the like to attract a child's attention. The rings 44, 46 may serve as a teething ring when the bottle is removed in light of the reduced risk that the rings can become dirty or touch a septic surface as a result of the attachment to the stroller.

It will be understood that the embodiment described herein are merely exemplary and that a person skilled in the art may make many variations and modifications without departing from the spirit and scope of the invention. All such variations and modifications are intended to be included within the scope of the invention as defined in the appended claims. For example, while the invention has been described as suited for a stroller, other uses are available which would not deviate from the scope of the invention. For example, the utility belt could be mounted to a high chair or walker and the objectives of the present invention can still be realized. Furthermore, while Velcro has been included in the preferred embodiment, it is to be understood that other means of fastening can easily be substituted without deviating from the scope of the invention. Snaps or buckles can be substituted for Velcro, for example. Therefore, it is to be understood that the invention includes these modifications and variations.

What is claimed is:

1. A utility belt for holding objects within reach of an occupant in a stroller comprising:

a traverse strap having first and second ends adapted to be respectively secured to opposite sides of a stroller in front of the occupant;

a plurality of tethers connected at a first end to said traverse strap between said first and second ends of said strap, said plurality of tethers each including a free end having means for releasably securing said free end to said traverse strap;

a bottle tether having at a free end means for releasably retaining a feeding bottle thereto; and a region of loop fastener of a hook-and-loop fastener at each of said first and second ends of said traverse strap and a region of hook fastener of a hook-and-loop fastener substantially between said regions of loop fastener for securing said strap to the stroller.

2. The utility belt as recited in claim 1 wherein said means for releasably securing to said traverse strap comprises a region of loop fastener of a hook-and-loop fastener at the free end of each of said tether.

3. The utility belt as recited in claim 1 wherein said means for releasably retaining a feeding bottle comprises a ring having a slot sized to receive said bottle tether therein through, said ring further comprising a generally flat annular member having a hole therein sized to receive a bottle neck therein, and a berm disposed at the outer periphery of the annular member.

4. The utility belt as recited in claim 3 wherein said annular member is beveled, and said ring further comprises a tab housing said slot.

5. The utility belt as recited in claim 3 further including a portion on a front surface of said traverse strap which may include a design or text.

6. The utility belt as recited in claim 3 wherein said plurality of tethers are each different colors.

7. The utility belt as recited in claim 1 wherein said means for releasably retaining a feeding bottle comprises a ring having a slot sized to receive said bottle tether thereinthrough, said ring further comprising a generally flat annular member having a hole therein sized to receive a bottle neck therein, and a berm disposed at the inner periphery of the annular member wherein said annular member has characters on an upper surface about a perimeter thereof.

8. The utility belt as recited in claim 1 wherein said means for releasably retaining a feeding bottle comprises a ring having slot sized to receive said bottle tether therein through.

9. The utility belt as recited in claim 8 wherein said ring comprises a generally flat annular member having a hole therein sized to receive a bottle neck therein.

10. The utility belt as recited in claim 9 further comprising a berm disposed at the outer periphery of the annular member.

11. The utility belt as recited in claim 9 further comprising a berm disposed at the inner periphery of the annular member.

12. The utility belt of claim 10 wherein said annular member of said ring is beveled, said ring further comprising a tab housing said slot.

13. The utility belt of claims 10 or 11 wherein said annular member of said ring has characters on an upper surface about a perimeter thereof.

* * * * *